United States Patent [19]

Melocik et al.

[11] Patent Number: 4,518,902

[45] Date of Patent: May 21, 1985

[54] PLUGGING ELECTRICAL BRAKING CONTROL CIRCUIT

[75] Inventors: Grant C. Melocik, Chardon; William Pickering, University Heights, both of Ohio

[73] Assignee: Towmotor Corporation, Mentor, Ohio

[21] Appl. No.: 455,776

[22] Filed: Jan. 5, 1983

[51] Int. Cl.³ .............................................. H02P 3/10
[52] U.S. Cl. ...................................... 318/373; 318/55; 318/80; 318/139; 318/258
[58] Field of Search ...................... 318/55, 58, 80, 82, 318/54, 65, 139, 332, 258, 261, 269, 273, 293, 295, 373

[56] References Cited

U.S. PATENT DOCUMENTS

| | | | |
|---|---|---|---|
| 3,551,773 | 12/1970 | Dannettell et al. | 318/341 |
| 3,710,216 | 1/1973 | Smith | 318/373 |
| 3,911,342 | 10/1975 | Herwig | 318/269 X |
| 4,363,999 | 12/1982 | Preikschat | 318/65 X |

FOREIGN PATENT DOCUMENTS

| | | | |
|---|---|---|---|
| 52-5110 | 1/1977 | Japan | 318/139 |
| 52-5111 | 1/1977 | Japan | 318/139 |
| 52-45787 | 11/1978 | Japan | 318/139 |
| 1456588 | 11/1976 | United Kingdom | 318/258 |
| 1551782 | 8/1979 | United Kingdom . | |

Primary Examiner—Vit W. Miska
Assistant Examiner—Bentsu Ro
Attorney, Agent, or Firm—Stephen L. Noe

[57] ABSTRACT

The invention pertains to a control system (46) for controlling the supply of power to a motor (12) to produce plugging electrical braking and current limit control, including a circuit (60) for controlling the direction of energization of the motor (12), a circuit (88) for generating digital numbers representing command motor speeds, a circuit (14) for generating a data signal representing a plugging condition, a programmable data processor (18) for generating pulse trains in dependence on the plugging condition, and a power transistor element (40) for coupling power to the motor (12) in response to the pulse trains. By using state-of-the-art digital, integrated circuit and software technology, prior, essentially linear or discrete component technology, which is relatively unreliable, expensive and slow, need not be used.

11 Claims, 6 Drawing Figures

FIG-3A

PLUGGING ELECTRICAL BRAKING CONTROL CIRCUIT

DESCRIPTION

1. Technical Field

This invention relates generally to a power supply control system and, more particularly, to a motor control apparatus for producing electrical braking.

2. Background Art

Electrical braking is a feature that has been utilized in motor control systems to provide controlled deceleration of a motor-driven device. Electrical braking is particularly advantageous when applied to the drive motors in an electric vehicle. For example, electrical braking can be used to slow the electric vehicle without applying the service brakes, thereby saving wear on them. Electrical braking is accomplished by energizing a motor in the direction opposite the current direction of rotation. Therefore, electrical braking occurs when a direction of travel opposite to the direction in which the vehicle is moving is selected, thereby energizing the motor or motors for driving the vehicle in the selected direction while the vehicle continues to move in the original direction.

For example, a motor control system for producing electrical braking typically includes a power coupling element which couples power to the motor and a plugging diode connected across the motor armature. With the vehicle moving in one direction, e.g., forward, a directional control switch is changed from a forward to a reverse position, commonly known as plugging the vehicle. The motor is now energized in the reverse direction but is still rotating in the forward direction and the power coupling element is pulsed on at a rate to reduce the speed of the vehicle. Until the vehicle slows to substantially zero speed, the motor acts as a generator and a voltage is developed to forward bias the plugging diode and enable the generated current to circulate about the motor armature and plugging diode. Ultimately, the vehicle will stop and reverse its direction, at which time the motor ceases generating current, the plugging diode is no longer forward biased, and the plugging action ceases.

Prior electrical braking control systems have the common disadvantage of utilizing analog and/or discrete component design concepts. Furthermore, they are complicated, not easily adjustable, and not able to use the same basic control circuit for different types of vehicles that have different design parameters, for example, stopping distance. Moreover, the prior control circuits are not as reliable, cost-effective and fast as a control circuit embodying computer technology.

The present invention is directed to overcoming one or more of the problems as set forth above.

DISCLOSURE OF THE INVENTION

In one aspect, the present invention includes an apparatus for electrically braking a motor. The apparatus has means for generating a plurality of respective motor power command signals in response to different motor speed commands and controllable supplying means for delivering motor power control signals to the motor. The improvement comprises means for supplying a plug signal in response to plugging of the motor, and processor means for receiving the plug signal and the command signals and delivering a preselected one of the motor power control signals to the supplying means in response to the received command signals and the receiving of the plug signal.

Prior control circuits for electrical braking do not include processor means and are based on analog designs. The present invention utilizes data processing techniques, is simple and is programmable to meet various design parameters.

BRIEF DESCRIPTION OF THE DRAWINGS

For a better understanding of the present invention, reference may be had to the accompanying drawings, in which.

BEST MODE FOR CARRYING OUT THE INVENTION

Figure 1:
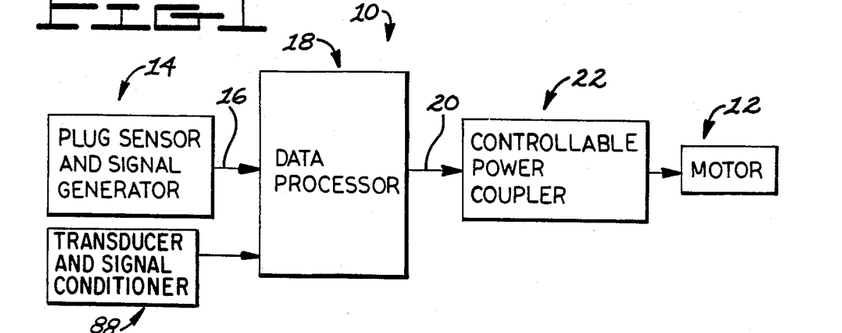
FIG. 1 is a block diagram of an embodiment of the present invention.

FIG. 1 illustrates an apparatus 10 for controlling the supply of power to a motor 12 and especially for electrically braking the motor 12. The apparatus 10 includes a means 88 for generating a plurality of different motor power command signals each in response to a respective motor speed command. The apparatus 10 also includes a means 14 for sensing a plugging condition and for supplying a data or plug signal to an output line 16 in response to plugging of the motor 12. The apparatus 10 additionally includes a programmable data processing means 18 for receiving the plug signal and the command signals and delivering a preselected one of the motor power control signal to an output line 20 in response to the received command signals being in a preselected range and to the receiving of the plug signal on the line 16. The apparatus 10 further includes a controllable supplying means 22 for receiving the signal on the line 20 and delivering motor power control signals to the motor 12 in response to the signal on the line 20.

Figure 2:
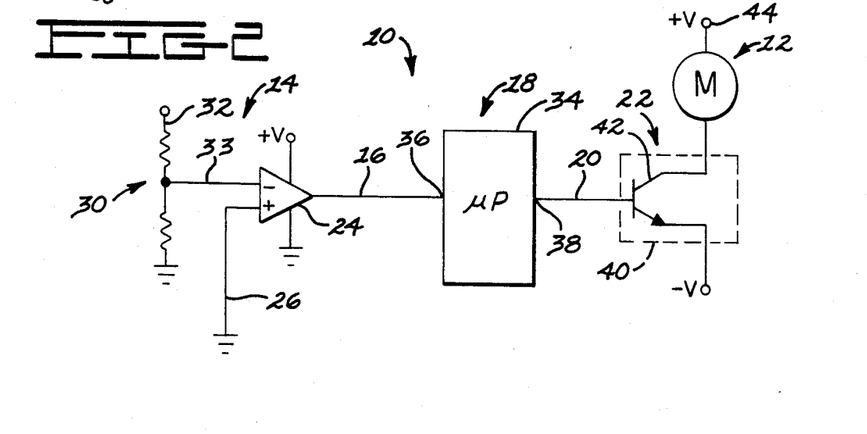
FIG. 2 is a partial schematic illustration of an embodiment of the present invention.

As shown in FIG. 2, the plug sensing and data signal generating means 14 includes an operational amplifier 24 having a non-inverting input (+) receiving a fixed reference voltage signal via an input line 26 connected to the apparatus 10 common or logic ground. A voltage divider 30 has an input line 32 and an output line 33 leading to the inverting input (−) of the amplifier 24. As will be further described, in response to plugging of the motor 12, a negative voltage is developed on the input line 32. In response, the voltage divider 30 develops a negative voltage signal on the line 33. Whenever plugging occurs, the voltage signal on the line 33 is negative with respect to the ground reference on the line 26, resulting in the amplifier 24 producing a logic 1 or true data signal on the line 16. In the absence of plugging, plus battery voltage is developed on the input line 32. In response, the voltage divider develops a positive voltage signal on the line 33. Therefore, the voltage signal on the line 33 is positive with respect to the ground reference on the line 26, resulting in the amplifier 24 producing a logic 0 or false data signal on the line 16.

The programmable data processing means 18 includes a microprocessor 34 having an input port 36 receiving the data signal on the line 16. The microprocessor 34 delivers a respective preselected motor power control signal in response to receiving each of the motor power command signals in the absence of the plug signal, i.e., to the logic 0 data signal on the line 16. Further, the microprocessor 34, under software control, generates at an output port 38, the preselected control signal or pulse train on the line 20 in response to receiving the plug signal, i.e., to the logic 1 data signal on the line 16.

The controllable supplying means 22 includes an on-off power coupling means 40 having a power transistor 42. The power transistor 42 is connected in series with the motor 12, as shown, to controllably couple power from a power source 44 (e.g. $\pm V_{BAT}$) to the motor 12. When the power coupling means 40 and, particularly, the transistor 42 is biased on by the pulse train on the line 20, the motor 12 is energized, and when biased off the motor 12 is deenergized.

Figure 3A:
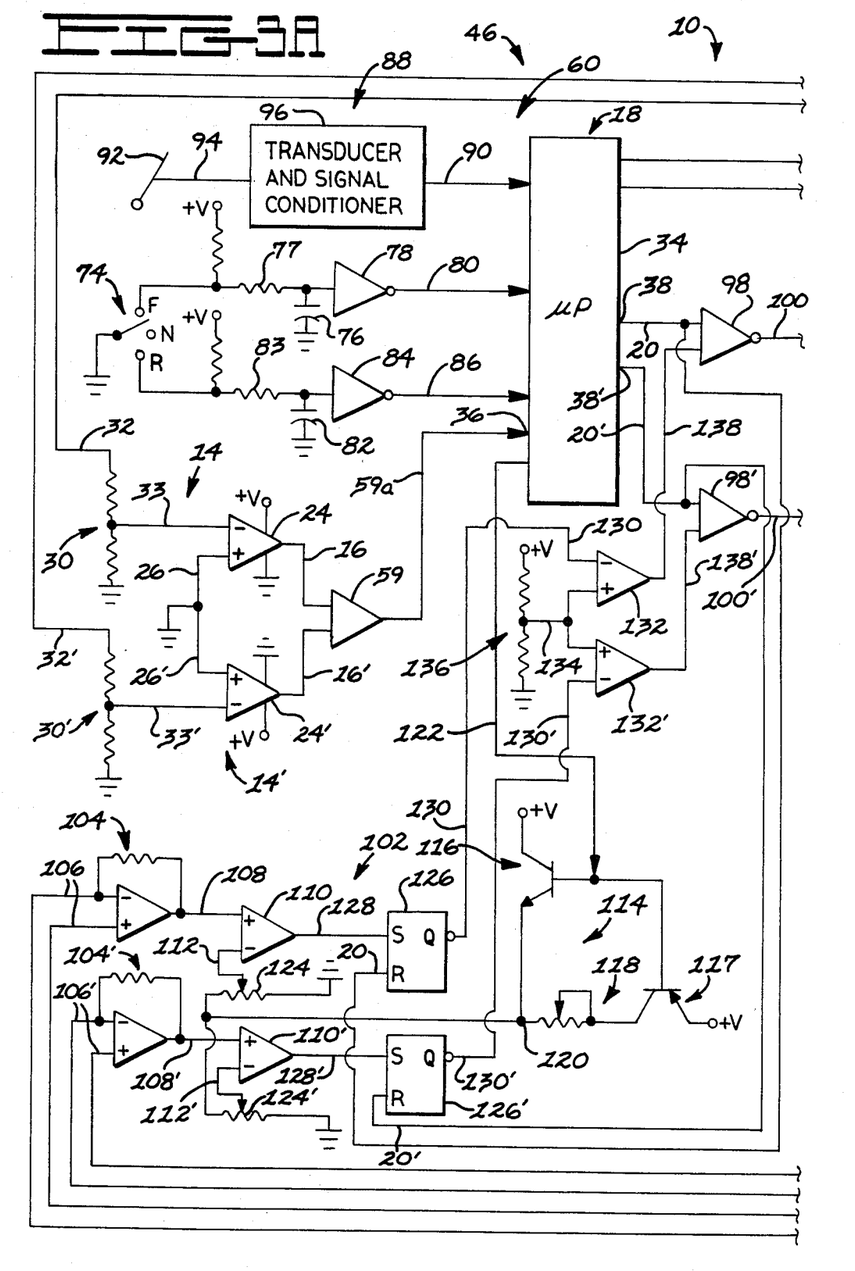
FIG. 3 shows schematically an overall motor control system having the present invention.
Figure 3B:
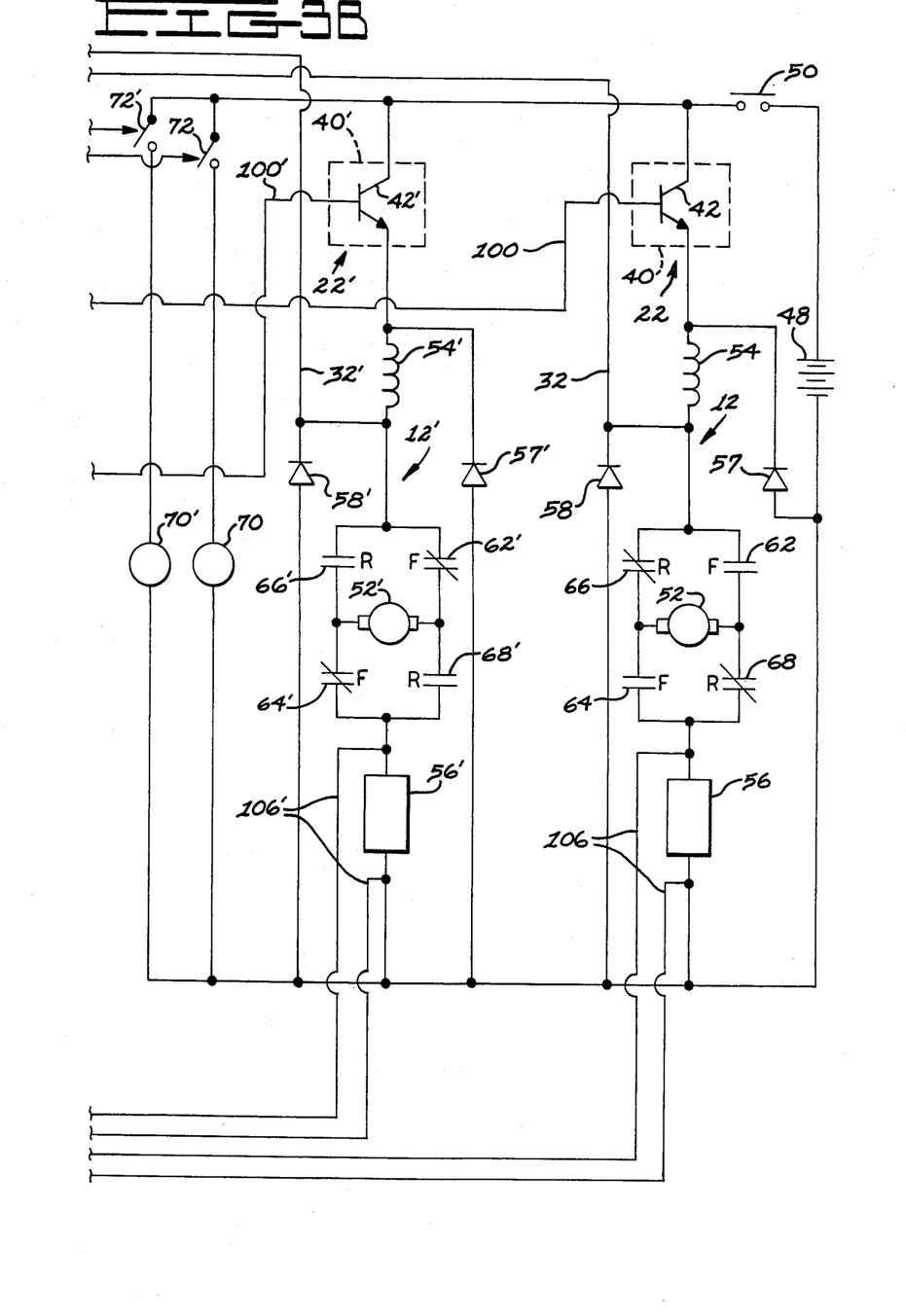

FIG. 3 shows the apparatus 10, including the means 14 for supplying a plug signal, the programmable data processing means 18 and the controllable supplying means 22, as part of an overall motor control system, shown generally at 46. Since the principles of the present invention can be applied to simultaneously control the supply of power to a plurality of motors, as one example, a second motor 12', similar to the motor 12, is shown, as well as another means 14' and another means 22' similar, respectively, to the means 14 and the means 22.

The control system 46 includes a power source 48, such as a vehicle battery $V_{BAT}$ that supplies power to the motors 12, 12' through a line contact 50. The motor 12 includes an armature 52 and a field winding 54 that are in series connection with a current shunt 56 and the transistor 42 of the supplying means 22. A flyback diode 57 is connected across the motor 12, as shown and as is conventional in the art. A plugging diode 58 is connected in parallel with the armature 52, as shown, and is forward biased during a plugging condition, as will be further described, in response to which current flows or circulates about a path including the armature 52, the plugging diode 58, and the shunt 56.

Similar components as just described are used in connection with the energization and power supply control of the motor 12'. This is indicated by the like reference numerals showing like components, such as the armature 52', the shunt 56', the flyback diode 57', and the plugging diode 58'.

Note, as one example, that the input line 32 of the voltage divider 30 and the input line 32' of the voltage divider 30' are connected to one side of the respective plugging diodes 58, 58'. Thus, the voltage delivered to the input lines 32, 32' is responsive to whether the respective plugging diodes 58, 58' are forward or reverse biased. If forward biased the respective motor 12, 12' is plugging and the logic 1 data signal on the line 16 or the line 16' is generated. An OR gate 59 gates either logic 1 data signal onto a line 59a connected to the input port 36 of the microprocessor 34. When both the plugging diode 58 and the plugging diode 58' are reverse biased, i.e., the motor 12, 12' is not plugging, a logic 0 data signal appears on the lines 16 and 16', and consequently on the line 59a.

A means 60 for controlling the direction of energization or rotation of the motor 12 is part of the control system 46. The means 60 includes normally open forward contacts 62 and 64, together with normally closed reverse contacts 66 and 68. Assuming that the line contact 50 is closed, the contacts 62, 64, 66, 68 are in the state shown, and the transistor 42 is on, current flows from the positive side of the power source 48, through the line contact 50, the transistor 42, the field winding 54, the contact 66, the armature 52, the contact 68, and the shunt 56 to the negative side of the power source 48. When the contacts 62, 64, 66, 68 are in their alternate state, and the transistor 42 is turned on, current flows from the positive side of the power source 48 through the line contact 50, the transistor 42, the field winding 54, the contact 62, the armature 52, the contact 64, and the shunt 56 to the negative side of the power source 48.

When a plugging condition occurs, the armature 52 acts as a generator. In response, the plugging diode 58 is forward biased so that current circulates from one side of the armature 52 through, for example, the closed contact 68, the shunt 56, the diode 58 and the closed contact 66 to the other side of the armature 52. The current circulates in the other direction through the armature 52 with the contacts 62, 64 being closed and the contacts 66, 68 being open.

The means 60 also includes a directional contactor coil 70 and a switch 72, such as a transistor, which, when closed or turned on, results in the energization of the coil 70 from the power source 48. The coil 70 controls the open-closed states of the contacts 62, 64, 66, 68 in a conventional manner. Another directional contactor coil 70' and switch 72' controls the open-closed states of similar contacts 62', 64', 66', 68' in a like manner. Therefore, the coils 70, 70' serve to control the direction of energization of the motors 12, 12'. Note that the forward contacts 62', 64' are normally closed and that the reverse contacts 66', 68' are normally open, which is the opposite of the normal state of the contacts 62, 64, 66, 68.

The means 60 further includes a directional control switch 74 having a forward position F, a neutral position N, and a reverse position R. With the switch 74 in the neutral position N, a capacitor 76 is charged via a resistor 77 to a logic 1 from +V and the output of an inverter 78 on a line 80 is a logic 0, and a capacitor 82 is charged via a resistor 83 to a logic 1 from +V and the output of an inverter 84 on a line 86 is a logic 0. In response to the directional control switch 74 being switched to the forward position F, the capacitor 76 is discharged through the resistor 77 and the switch 74 to a logic 0 and the output on the line 80 from the inverter 78 is a logic 1 representing the forward direction. In response to the directional control switch 74 being switched to the reverse position, the capacitor 82 is discharged through the resistor 83 and the switch 74 to a logic 0 and the output on the line 86 from the inverter 84 is a logic 1 representing the reverse direction.

Under software control, the microprocessor 34 of the data processing means 18 responds to the logic 1 on the line 80 to close or turn on the switch 72, energize the coil 70, and change the state of the contacts 62, 64, 66, 68. Therefore, the forward contacts 62, 64 are closed, the reverse contacts 66, 68 are opened and the forward contacts 62', 64' remain closed, so that the motor 12 and the motor 12' can be energized in the same, i.e., forward direction. Likewise, under software control, the microprocessor 34 responds to the logic 1 on the line 86 to close or turn on the switch 72', energize the coil 70', and change the state of the contacts 62', 64', 66', 68'. Therefore, the reverse contacts 66', 68' are closed, the forward contacts 62', 64' are opened and the reverse contacts 66, 68 remain closed, so that the motor 12 and the motor 12' can be energized in the same, i.e., reverse direction.

The control system 46 has a means 88 for generating a plurality of different motor power command signals, specifically digital numbers, each in response to a respective motor speed command, on an output line 90. For example, the data produced by the generating means 88 on the line 90 can be 4-bit digital numbers ranging from 0000 to 1111. Each digital number in the range 0000–1111 represents a different motor speed command for the motors 12 and 12'. For example, number 0000 represents zero speed, number 1000 represents half speed and number 1111 represents full or maximum speed. Under software control, the microprocessor 34 responds to the digital numbers on the line 90 by delivering respective preselected motor power control signals, via lines 20 and 20', to the supplying means 22, 22'.

Thus, in the present example, since there are sixteen digital numbers or command power signals in the range 0000–1111, there are sixteen different power control signals, for example pulse trains, that can be produced on the lines 20 and 20' to rotate the motors 12 and 12' at sixteen different speeds. The sixteen pulse trains that can be produced by the microprocessor 34 can each be different in duty factor, or proportion of pulse on-time to pulse off-time.

The range of digital numbers from 0000 to 1111 in the binary coded decimal format (BCD) is used only for convenient illustration and can, of course, be any other suitably coded power representation having a number of bits consistent with the desired precision, for example, a gray code.

In one example, the generating means 88 is coupled to an accelerator pedal 92 via a linkage 94. The generating means 88 includes a transducer and signal conditioning circuit 96 for converting position information, i.e., motor speed command information, of the accelerator pedal 92 to any one of the digital numbers 0000–1111 on the line 90.

Assume normal operating, i.e., non-plugging, conditions, are in effect. When the accelerator pedal 92 is fully released or not depressed, the generating means 88 responds to this information by outputting the digital number 0000 on the line 90. The microprocessor 34 responds by not producing any motor power control signal or pulse train on the lines 20 and 20'.

When the accelerator pedal 92 is depressed to, for example, a half speed position, the microprocessor 34 responds to the number 1000 on the line 90 and to the absence of a plug signal from the means 14, 14', by delivering a preselected one of the motor power control signals on the lines 20 and 20' corresponding to this command signal. When the accelerator pedal 92 is depressed to, for example, a full speed position, the microprocessor 34 responds to the number 1111 on the line 90 and to the absence of the plug signal by outputting a pulse train on the lines 20 and 20' corresponding to maximum power.

Assume now, however, that the plugging condition is in effect. The means 88 continues to generate digital numbers on the line 90 in response to the position of the accelerator pedal 92. However, during the plugging condition, the microprocessor 34 produces only one preselected motor power control signal or pulse train on the lines 20 and 20' corresponding to, for example, minimum power greater than zero, in response to receiving the plug signal and any command power signal greater than zero.

A two-input NOR gate 98 has a first input connected to the line 20 and an output coupled by a line 100 to the supplying means 22. A two-input NOR gate 98' has a first input connected to the line 20' and an output coupled by a line 100' to the supplying means 22'. The second input to the gates 98 and 98' is discussed below. The gates 98 and 98' pass or do not pass the control signals on the lines 20 and 20' to the lines 100 and 100' in response to the state (logic 0 or logic 1) of the second gate 98, 98' input.

Assume the gates 98 and 98' are enabled to pass the respective signals on the lines 20 and 20'. When the signals or pulses on the lines 20 and 20' are high or logic 1, the output of the gate 98 and the gate 98' on the line 100 and the line 100' are low or logic 0. In response, the supplying means 22 and 22' block the control signals from the motors 12 and 12' and turn off the transistors 42 and 42', thereby deenergizing the motors 12 and 12'. When the pulses on the lines 20 and 20' are low or are logic 0, the outputs of the gate 98 and the gate 98' on the line 100 and the line 100' are high or logic 1. In response, the supplying means 22 and 22' deliver the control signals to the motors 12 and 12' by turning on the transistors 42 and 42', thereby energizing the motors 12 and 12'.

The control system 46 also includes a means 56 for supplying a current signal in response to the magnitude of current passing through the motor 12, and a blocking means 102 for limiting current flow through the motor 12. The blocking means 102 receives the current signal and the plug signal, and limits the motor 12 current to a first preselected maximum magnitude in response to receiving the plug signal and to a second preselected maximum magnitude in response to the absence of the plug signal. The blocking means 102 also includes the means 98 for controllably, selectively modifying the control signals, as discussed below. A differential amplifier 104 has inputs 106 coupled across the shunt 56 to monitor or sense current flow through the armature 52 of the motor 12. The output voltage signal of the amplifier 104 on a line 108 is responsive to the armature current. An operational amplifier or comparator 110 has one input (+) coupled to the line 108. Another input (−) receives a reference voltage signal on a line 112. The reference voltage signal on the line 112 can be one of two levels, in response to whether the motor 12 is being energized under normal operating conditions or under plugging conditions, as will be further described.

A means 114 for limiting the current through the motor 12 to a first preselected maximum value if the normal operating condition is in effect and to a second preselected maximum value if the plugging condition is in effect, produces the reference voltage signal on line 112. The means 114 includes a first transistor 116 and a first potentiometer 118 connected at a common junction 120. The transistor 116 is biased on and off in response to a control signal on a line 122 from the microprocessor 34. This control signal is produced in response to receiving the data signal on the lines 16 or 16'. This data signal is received via the OR gate 59 and the line 59a. A second potentiometer 124 is also connected to the junction 120. A second transistor 117 is connected to the first potentiometer 118 and is biased on and off in response to the same control signal on the line 122.

Under non-plugging operating conditions, the data signals on the lines 16 and 16' are logic 0. The microprocessor 34 responds under software control by outputting the control signal on the line 122 to bias on the transistor 116 and bias off the transistor 117. Consequently, the voltage signal at the junction 120 is the output of the transistor 116. This reference voltage signal is coupled via the potentiometer 124 to the line 112. During the plugging condition, however, the data signal on one or both of the lines 16 or 16' is logic 1. The microprocessor 34 responds by outputting the control signal on the line 122 to bias off the transistor 116 and bias on the transistor 117. In this condition, the voltage signal at the junction 120 is taken from the potentiometer 118 and coupled to the potentiometer 124. Therefore, the voltage signal delivered to the potentiometer 124 is at a level responsive to the setting of the potentiometer 118 which may be different from the level present during non-plugging operating conditions.

A latch 126 has a set input "S" connected to the output of the comparator 110 via a line 128. A reset input "R" of the latch 126 is coupled to the line 20 carrying the control signal or pulse train produced by the microprocessor 34 and is reset with each logic 1 or high pulse of the signal. The latch 126 has an output "Q" coupled to a line 130, which is one input to a comparator 132. The other input to the comparator 132 receives a reference voltage signal on a line 134 from the output of a voltage divider 136. The output of the comparator 132 is coupled to a line 138 which is the second input to the gate 98.

Current limiting means 102 also includes corresponding components indicated by like reference numerals for limiting current through the motor 12'. Only a single means 114 is needed to provide reference voltage signals on the lines 112 and 112' and, thereby, limit the current through the motors 12 and 12' to one maximum value or another.

For an example of the operation of the current limiting means 102, assume that non-plugging conditions exist, the transistor 116 is biased on, and a reference voltage signal is produced on line 112. If the current through the armature 52 of the motor 12 does not exceed the preselected maximum value or magnitude, the signal on the line 108 is less positive than the signal on the line 112, resulting in a logic 0 on the line 128. This logic 0 is latched in the latch 126, which produces a logic 1 on the line 130 that is delivered as one input to the comparator 132. Note that each pulse of the pulse train on the line 20 resets the latch 126, but, since a logic 0 remains on the line 128 as long as the preselected maximum current has not been reached, the latch 126 is continually set to maintain the logic 1 voltage signal on line 130. Since the other input or reference voltage on the line 134 to the comparator 132 is fixed by the voltage divider 136 at a level lower than the logic 1 on the line 130, the output of the comparator 132 on the line 138 is logic 0 and is delivered to the second input of the gate 98. Therefore, the output of the gate 98 on the line 100 follows the waveform of the control signal or pulse train on the line 20 and biases on and off the transistor 42 in response to that waveform, with a low pulse or logic 0 on the line 20 ultimately turning on the transistor 42 and a high pulse or logic 1 turning off the transistor 42 and resetting the latch 126.

Assume under normal operating conditions that the current through the armature 52 of the motor 12 exceeds the preselected maximum value resulting in the signal on the line 108 from the differential amplifier 104 being higher than the reference voltage signal on the line 112 and a logic 1 being on the line 128. Consequently, the latch 126 stores the logic 1 and produces the logic 0 voltage signal on the line 130 as an input to the comparator 132. Since the other reference voltage input to the comparator 132 on the line 134 is higher than this logic 0, the output of the comparator 132 on the line 138 is a logic 1 or current limit control signal. Therefore, the output of the gate 98 on the line 100 remains a logic 0, irrespective of the signal on the line 20, and the transistor 42 remains off.

Thus, whenever the current exceeds the preselected maximum value set by the potentiometer 124 for non-plugging operating conditions, the transistor 42 is turned off to stop the current flow through the motor 12 until the current falls below this value. The test as to whether the motor current exceeds or is less than the preselected value is made with each pulse on the line 20 by resetting the latch 126 with each such pulse.

Now assume that the plugging condition is occurring. The transistor 116 is biased off and the reference voltage signal on the line 112 is adjustable according to the setting of the potentiometer 118 which means that the preselected maximum current allowable through motor 12 during plugging is adjustable to a value or magnitude different from the non-plugging magnitude. The differential amplifier 104 continues to monitor the armature current of the motor 12 and produce the voltage signal on the line 108 and the comparator 110 compares this voltage signal to the adjustable reference voltage signal on the line 112. As can now be appreciated from the previous discussion, the gate 98 produces the output on the line 100 that follows the signal on the line 20 when the armature current does not exceed the preselected value, and produces a constant logic 0 value whenever the armature current exceeds the preselected value. The transistor 42 will be biased accordingly.

It can now also be appreciated that the other components of the current limiting means 102 function in the same manner to monitor and control the current through the armature 52' of the motor 12'. Thus, the output of the gate 98' on the line 100' biases the transistor 42' in the same manner as the output of the gate 98 on the line 100 biases the transistor 42.

Figure 4:
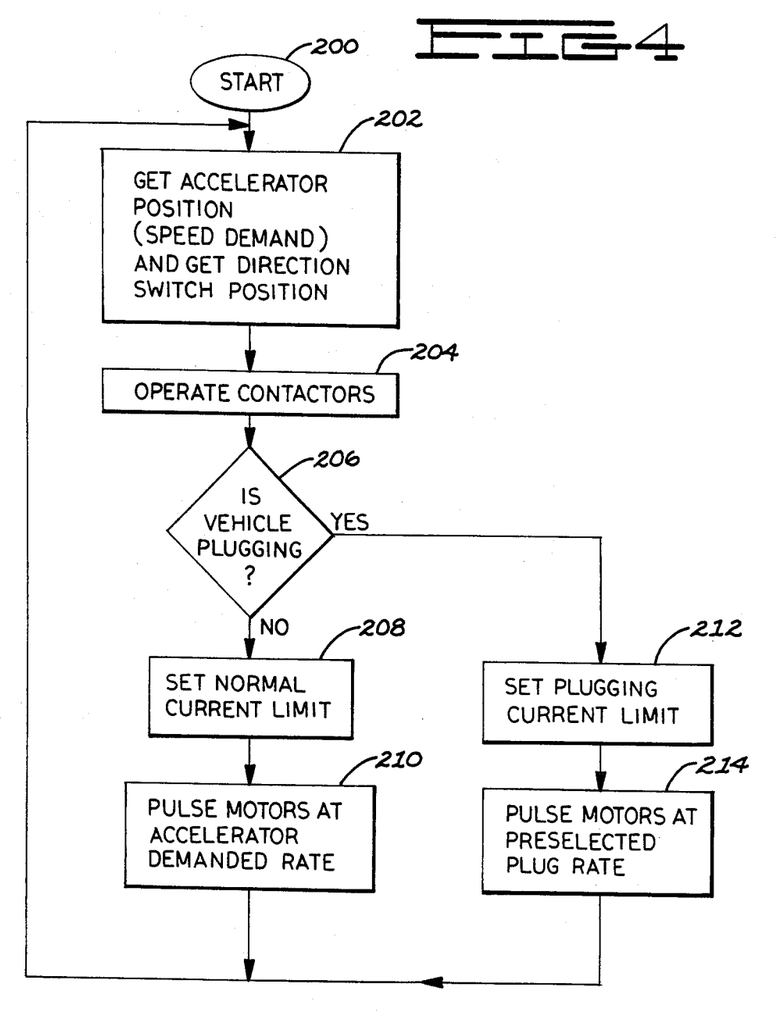
FIG. 4 is a flowchart used to explain the software used with an embodiment of the present invention; and, FIG. 5 is a schematized top view of an electric vehicle including the motor control system of the present invention.

FIG. 4 is a flowchart of a computer program suitable for controlling the apparatus 10. Only an exemplary software routine sufficient to implement the present invention is described herein. Sufficient detail is presented to allow one skilled in computer programming to write the required program to implement the flowchart for any common microprocessor. The program of FIG. 4 was designed to be run on a microprocessor produced by MOSTEK Corporation of Carrollton, Tex. and designated by the part number 3870.

Upon beginning the flowchart of FIG. 4 at the block 200 labeled START, program control progresses through the following sequence:

In the block 202 the microprocessor 34 receives the information relating to the accelerator pedal 92 position or speed demand that is supplied on the line 90 and the information relating to the direction switch 74 position that is supplied on the lines 80, 86. The microprocessor 34 then outputs, in the block 204, appropriate control signals to the switches 72, 72' to drive the direction contact coils 70, 70' for vehicle 142 operation in the direction required by the direction switch 74.

In the block 206, the microprocessor 34 next checks the port 36 to determine if the vehicle 142 is in a normal, non-plugging operating condition or in a plugging condition. If the vehicle 142 is not plugging, control passes to the block 208 where a signal is output on the line 122 to turn the transistor 116 on and the transistor 117 off, thus setting the current limit reference voltage at a preselected level.

Next, in the block 210, the microprocessor 34 determines, either by calculation or from a look-up table stored in memory, appropriate pulse train waveforms to output at the ports 38, 38' to operate the vehicle 142 at the speed demanded by the accelerator pedal 92 position. For example, if the command digital number is 1000, indicating a half motor power requirement, a 50% duty factor pulse train will be output by the block 210. Each digital command number between 0000 and 1111 will result in a corresponding pulse train duty factor being output by the block 210. Control is then transferred back to the block 202 and the process begins anew.

If, in the block 206, the vehicle 142 is found to have entered the plugging mode, control proceeds to the block 212 rather than to the block 208. In the block 212 a signal is output on the line 122 to turn the transistor 116 off and the transistor 117 on, thus setting the current limit reference voltage at a preselected level that may be different from the level selected in the block 208.

Next, in the block 214, the microprocessor 34 outputs preselected pulse train waveforms at the ports 38, 38' to pulse the motors 12, 12' for plugging without regard to the accelerator pedal 92 position. The exception is for an accelerator pedal 92 position demanding zero speed, in response to which the motors 12, 12' are not pulsed or energized at all. Control then returns to the block 202 and the routine is repeated.

Figure 5:
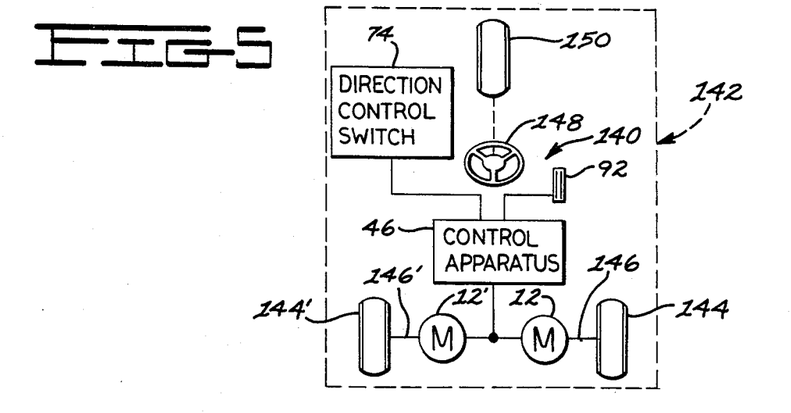

FIG. 5 shows an overall vehicle control system 140 for an electric vehicle 142, such as an electric fork lift truck, having a left drive wheel 144 and a right drive wheel 144'. The motor 12 rotates the drive wheel 144 through a shaft 146 and the motor 12' rotates the drive wheel 144' through a shaft 146'. The control system 46 controls the energization and deenergization of the motors 12 and 12' in the manner previously described and in response to the directional control switch 74 and the accelerator pedal 92. Also shown is a steering wheel 148 and a steerable wheel 150 that is controlled by the steering wheel 148.

INDUSTRIAL APPLICABILITY

In the overall operation of the vehicle 142 and the vehicle control system 140, assume, for example, that the directional control switch 74 is in the forward position F, that the accelerator pedal is at a full speed position, and that the vehicle 142 is moving in the forward direction. This constitutes a normal, non-plugging, operating condition since the vehicle 142 is moving in the direction called for by the directional control switch 74. Also assume that the line contact 50 has been closed in response to the energization of a contactor coil (not shown).

The microprocessor 34 receives the logic 1 direction signal on the line 80, the digital command signal number 1111 on line 90 and the logic 0 data signal on the line 59a via the gate 59. Responsively, the microprocessor 34 has closed the switch 72 to energize the coil 70 and is producing the pulse train or control signal corresponding to full motor power on the lines 20 and 20'. As a result, the motors 12 and 12' are being energized to move the vehicle 142 in the forward direction at maximum speed.

Under this normal operating condition in which the vehicle 140 is moving in the same direction called for by the directional switch 74, the plugging diodes 58 and 58' are reverse biased. During the on time of the transistor 42 and the transistor 42', current flows from the power source 48 through the motors 12, 12' and the shunts 56, 56'. During the off time, current does not flow from the power source 48 through the motors 12, 12' or the shunts 56, 56', and the plugging diodes 58 and 58' remain reverse biased.

Now assume that electrical braking is to be accomplished while, for example, the accelerator pedal 92 remains depressed to the full speed position. The directional switch 74 is switched into the reverse position "R". The microprocessor 34 responds to the logic 1 data signal on the line 86 by closing the switch 72' and opening the switch 72. The coil 70' is now energized and the coil 70 is deenergized. Therefore, the motors 12 and 12' are connected for driving the vehicle 142 in the reverse direction. However, since the vehicle 142 is still moving in the forward direction, the plugging condition occurs.

During the plugging condition, the armatures 52 and 52' act as generators. The plugging diodes 58 and 58' responsively become forward biased. This is detected by the plug sensing and data signal generating means 14, 14'. The microprocessor 34 receives the logic 1 plug signal on the line 59a and responds by outputting the control signal or waveform on the line 20 and the line 20' corresponding to one preselected motor power greater than zero, irrespective of the presence of the maximum power digital number 1111 on the line 90. For example, this waveform corresponds to the minimum motor power greater than zero to slowly brake or stop the vehicle 142.

During the off time of the pulses of the preselected motor speed waveform, the transistors 42 and 42' are biased on and energize the motors 12 and 12' for reverse drive, with power being supplied by the power source 48. During the on time of the pulses, and hence off-time of the transistors 42 and 42', power is not supplied by the power source 48, and the current generated by the armatures 52, 52' circulates through the respective armatures 52, 52', diodes 58, 58' and shunts 56, 56'. Ultimately, the vehicle 142 is electrically braked to a stop and commence moving in the reverse direction. Under this condition, the plugging condition ceases, i.e., the normal operating condition occurs, in which the armatures 52 and 52' no longer act as generators and the plugging diodes 58 and 58' become reverse biased. Therefore, the microprocessor 34 responds to the logic 0 data signal on the line 59a and the digital number 1111 on the line 90 by outputting again the corresponding control signal on the line 20 and the line 20' and accelerates the vehicle 142 up to full speed in the reverse direction.

It can now also be appreciated that a similar normal condition will occur when the vehicle 142 is being driven in the reverse direction with the switch 74 in the reverse position R, and a similar plugging condition will occur when the switch 74 is moved to the forward position F. The vehicle 142 is electrically braked to a stop with the preselected control signal or pulse train generated on the line 20 and the line 20', and will thereafter move in the forward direction at the speed commanded by the position of the accelerator pedal 92 and the corresponding control signal or pulse train generated on the line 20 and the line 20'.

The current limiting means 102 functions during all of the above normal operating and plugging conditions to limit current through the motors 12 and 12' to one or the other preselected maximum values specified by the reference voltage signal on the line 112.

In summary, the apparatus 10 and overall motor control system 46 utilize the advantages of digital data processing and logic network design, including the microprocessor 34 and the various logic gates and latches, to perform electrical braking and current limit control during both normal operating and plugging conditions. These components preferably are manufactured as integrated circuits and provide an overall system that is reliable, cost-effective and fast. Moreover, the microprocessor 34 is easily programmed to output any one control signal or pulse train on the line 20 and the line 20' during the plugging condition to control the electrical braking. The higher the duty factor of this one waveform, the greater will be the power supplied to the motors 12 and 12' and the shorter will be the stopping distance.

Other aspects, objects and advantages of the present invention can be obtained from a study of the drawings, the disclosure and the appended claims.

We claim:

1. In an apparatus (10) for electrically braking a motor (12), said apparatus (10) having means (88) for generating a plurality of different motor power command signals each in response to a respective motor speed command, and controllable supplying means (22) for delivering motor power control signals to said motor (12), the improvement comprising:
   means (14) for supplying a plug signal in response to plugging of said motor (12);
   means (56) for supplying a current signal in response to the magnitude of current passing through said motor (12); and,
   blocking means (102) for receiving said current signal and said plug signal, and limiting said current to a first preselected maximum magnitude in response to the receiving of said plug signal and to a second preselected maximum magnitude in response to the absence of said plug signal, said blocking means (102) including means (98) for controllably modifying said control signals.

2. In an apparatus (10) for electrically braking a motor (12), said apparatus (10) having means (88) for generating a plurality of different motor power command signals each in response to a respective motor speed command, and controllable supplying means (22) for delivering motor power control signals to said motor (12), the improvement comprising:
   means (14) for supplying a plug signal in response to plugging of said motor (12);
   processor means (18) for receiving said plug signal and said command signals and delivering a preselected one of said motor power control signals to said supplying means (22) in response to said received command signals being in a preselected range and to the receiving of said plug signal;
   means (56) for supplying a current signal in response to the magnitude of current passing through said motor (12); and,
   blocking means (102) for receiving said current signal and said plug signal, and limiting said current to a first preselected maximum magnitude in response to the receiving of said plug signal and to a second preselected maximum magnitude in response to the absence of said plug signal.

3. An apparatus (10), as set forth in claim 2, wherein said processor means (18) delivers respective preselected motor power control signals to said supplying means (22) in response to receiving each of said motor power command signals in the absence of said plug signal.

4. An apparatus (10), as set forth in claim 2, wherein said blocking means (102) includes means (98) for controllably modifying said control signals.

5. In an apparatus (10) for electrically braking a motor (12), said apparatus (10) having means (88) for generating a plurality of different motor power command signals each in response to a respective motor speed command, and controllable supplying means (22) for delivering motor power control signals to said motor (12), the improvement comprising:
   means (14) for supplying a plug signal in response to plugging of said motor (12);
   processor means (18) for receiving said plug signal and said command signals and delivering a preselected one of said motor power control signals to said supplying means (22) in response to said received command signals being in a preselected range and to the receiving of said plug signal, and in response to receiving each of said motor power command signals in the absence of said plug signal;
   means (56) for supplying a current signal in response to the magnitude of current passing through said motor (12); and,
   blocking means (102) for receiving said current signal and said plug signal, and limiting said current to a first preselected maximum magnitude in response to the receiving of said plug signal and to a second preselected maximum magnitude in response to the absence of said plug signal.

6. An apparatus (10), as set forth in claim 5, wherein said blocking means (102) includes means (98) for controllably modifying said control signals.

7. An apparatus (10), as set forth in claim 5, wherein said control signals are a plurality of pulse trains having respective duty factors.

8. A motor braking apparatus (10), comprising:
   an accelerator pedal (92) being movable to a plurality of motor speed command positions;
   means (88) for generating respective digital motor power command signals each in response to a different one of said command positions;
   means (14) for supplying a plug signal in response to plugging of said motor (12);
   processor means (18) for receiving said plug signal and said command signals, supplying a first preselected motor power control signal in response to the receiving of said command signals in a first preselected range and the receiving of said plug signal, and supplying a plurality of second preselected control signals in response to the receiving of said command signals in the absence of said plug signal; and,
   controllable supplying means (22) for receiving said control signals and delivering respective pulse trains to said motor (12) in response to each of said control signals.

9. An apparatus (10), as set forth in claim 8, including means (56) for supplying a current signal in response to the magnitude of current passing through said motor (12); and, blocking means (102) for receiving said current signal and said plug signal, selectively modifying said received control signals, and limiting said current to a first preselected maximum magnitude in response to receiving said plug signal and to a second preselected maximum magnitude in response to the absence of said plug signal.

10. A motor braking apparatus (10), comprising:

means (14) for sensing plugging of said motor (12) and delivering a plug signal in response to said sensed plugging;

means (88) for sensing a motor speed command and delivering a digital command signal in response to said command;

means (56) for sensing motor current and delivering a current signal in response to the magnitude of said current;

processor means (18) for receiving said plug signal and command signals and delivering a plurality of pulse trains in response to receiving said command signal in the absence of said plug signal, and delivering a preselected one of said plurality of pulse trains in response to receiving said command signals in a preselected range and receiving said plug signal;

means (102) for receiving said current signal and said plug signal, controllably modifying said pulse trains, and limiting said current to a first preselected maximum magnitude in response to receiving said plug signal and said current signal and limiting said current to a second preselected maximum magnitude in response to receiving said current signal in the absence of said plug signal; and, controllable supplying means (22) for receiving said pulse trains and delivering said pulse trains to said motor (12).

11. An apparatus (10), as set forth in claim 10, wherein said processor means (18) is a programmable microprocessor (34).

* * * * *